(12) United States Patent
Boyk

(10) Patent No.: US 10,968,011 B1
(45) Date of Patent: Apr. 6, 2021

(54) PALLET POCKET REUSABLE SYSTEM

(71) Applicant: AMERISTAR SOLAR, LLC, Banks, OR (US)

(72) Inventor: Sidney William Boyk, Banks, OR (US)

(73) Assignee: AMERISTAR SOLAR, LLC, Banks, OR (US)

( * ) Notice: Subject to any disclaimer, the term of this patent is extended or adjusted under 35 U.S.C. 154(b) by 0 days.

(21) Appl. No.: 16/908,994

(22) Filed: Jun. 23, 2020

Related U.S. Application Data

(60) Provisional application No. 62/961,555, filed on Jan. 15, 2020, provisional application No. 62/940,571, filed on Nov. 26, 2019.

(51) Int. Cl.
*B65D 19/00* (2006.01)
*B65D 19/44* (2006.01)
*B65D 19/40* (2006.01)

(52) U.S. Cl.
CPC ......... *B65D 19/0004* (2013.01); *B65D 19/40* (2013.01); *B65D 19/44* (2013.01); *B65D 2519/00815* (2013.01)

(58) Field of Classification Search
CPC .... B65D 19/0004; B65D 19/40; B65D 19/44; B65D 2519/00815
USPC ......................................................... 410/96
See application file for complete search history.

(56) References Cited

U.S. PATENT DOCUMENTS

| | | | | |
|---|---|---|---|---|
| 2,534,057 A * | 12/1950 | Pride | ......... | B60P 1/52 414/500 |
| 3,173,539 A * | 3/1965 | Looker | ......... | B65D 19/44 206/597 |
| 3,508,502 A * | 4/1970 | Sims | ......... | B61D 45/003 410/103 |
| 4,340,329 A * | 7/1982 | Ericsson | ......... | B60P 7/0838 410/101 |
| 4,382,736 A * | 5/1983 | Thomas | ......... | B60P 7/083 410/100 |
| 5,423,428 A * | 6/1995 | Selz | ......... | B60P 7/0869 206/386 |
| 6,059,499 A * | 5/2000 | Bird | ......... | B60P 7/083 410/103 |
| 6,524,040 B1 * | 2/2003 | Heil | ......... | B65D 19/0014 410/100 |
| 6,821,068 B2 * | 11/2004 | Facey | ......... | B60P 7/0838 410/100 |
| 6,929,438 B1 * | 8/2005 | Foster | ......... | B60P 7/083 410/100 |
| 7,476,069 B2 * | 1/2009 | Facey | ......... | B60P 7/083 410/100 |
| 8,469,329 B2 * | 6/2013 | Tygard | ......... | B65D 19/38 248/436 |
| 10,647,243 B2 * | 5/2020 | Williams | ......... | B60P 7/0838 |
| 2003/0031524 A1 * | 2/2003 | Brunet | ......... | B60P 7/083 410/100 |

* cited by examiner

*Primary Examiner* — Hilary L Gutman
(74) *Attorney, Agent, or Firm* — Miller Nash Graham & Dunn LLP

(57) ABSTRACT

A pallet system has a pallet having two sides, two ends, a load area, and at least two feet. At least one of the feet has inside of it a reel rod holding a first gear, a front compartment cover, a hinge to allow the front compartment cover to open, and at least one cable on the reel rod.

14 Claims, 8 Drawing Sheets

PALLET POCKET REUSABLE SYSTEM

RELATED APPLICATIONS

This application is a continuation of, and claims priority to, US Provisional Patent Application Nos. 62/940,571, filed Nov. 26, 2019, and 62/961,555, filed Jan. 15, 2020, which are incorporated herein by reference in their entirety.

FIELD

This disclosure relates to banding systems to secure loads to pallets, more particularly to re-usable banding systems.

BACKGROUND

Pallets, typically a wooden platform used to move cargo, have two different kinds, stringer pallets and block pallets. Stringer pallets are generally the more common pallet and comprises a set of deck boards fastened to stringer with gaps in between. Typically, the stringers are 48-inch long pieces of wood that are oriented vertically so the long face is vertical with the shorter sides being the top and bottom. Block pallets have blocks of wood instead of stringers. The deck boards are typically 40 inches long and spaced apart on the stringers so that there are gaps. Recently, many shipping companies have started to move to more sturdy pallets that are re-usable.

When freight or other loads are placed on the pallets, they are often fastened to the pallet with bands. Most designs of the bands are based on the working break strength of the banding materials and the number of bands necessary to meet the pallet weight. A typical pallet is built to withstand a load of 4600 pounds. Single-use steel banding can meet the requirement but single-use plastic banding is usually not strong enough. In fact, in order to get the same cargo strength of steel or cable banding, they would have to use 10 plastic bands across the cargo. The international shipping industry is moving away from plastic banding and looking for more renewable banding/packaging systems.

The USA uses over 1.9 billion pallets every year. The worldwide pallet industry is expected to reach $89.1 billion dollar in sales by 2025. Providing a re-usable, convenient banding system for pallets would alleviate that problem.

An issue that arises with re-usable banding, however, involves storing the re-usable bands once the load leaves the pallet.

DETAILED DESCRIPTION

The embodiments here involve a re-usable banding system having a block assembly that inserts between the boards on a 40"×48" pallet. The standard stringer pallet has 5-6 openings on each pallet, each opening ⅝" H×3.25" W×40" L. These cavities provide an excellent area to insert block assemblies for a re-usable cabling system. The block assemblies will most likely be arranged in at least 3 or 4 of those cavities.

As used here, the term "block assembly" includes: a tightening drive that allows a user to tighten the cables after deploying the cables on the load; cables, also referred to as bands, edge protectors that deploy on the loads to protect the load; pallet cable hooks that allow attachment of the cables to the pallets; end swage balls that finish the ends of the cables; and various other attachments and openings that allow deployment and stowing of the block assemblies.

Figure 1:
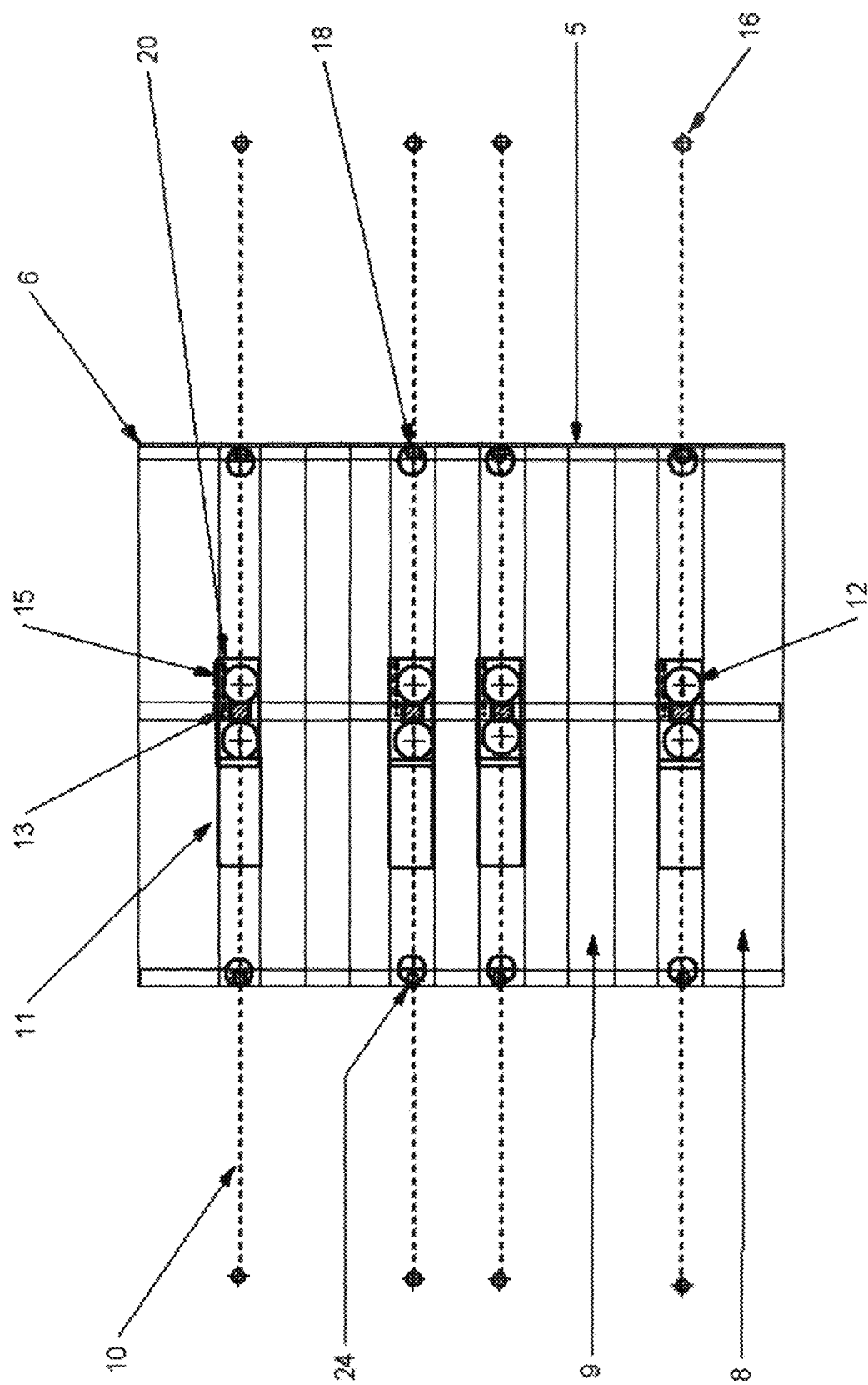
FIG. 1 shows a top view of an empty pallet with an embodiment of a re-usable banding system.

FIG. 1 shows an embodiment of an empty pallet with the block assemblies. The pallet 5 has cavities such as 9 between the deck boards such as 8 mounted on the stringers such as 6. These cavities allow the block assemblies to be stowed in the pallet such that the top surface of the tightening drive body 20 is flush with the top of the deck boards of the pallet. In one embodiment, the tightening drive 13 comprises a worm drive, typically understood to have a worm screw and a worm wheel. The tightening drive may have a recessed handle 15 that will be used to ratchet or otherwise tighten the cables when deployed, discussed in more detail later. The tightening drive may have a protective sliding lid 11.

Figure 4:
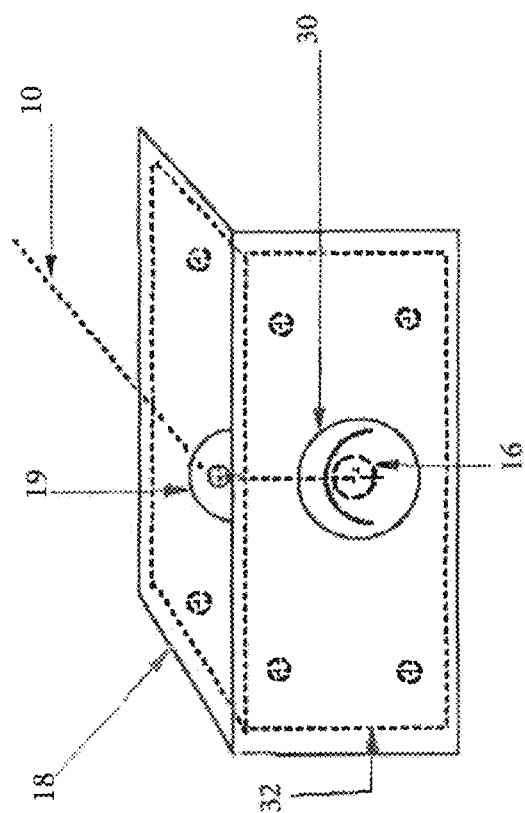
FIG. 4 shows an embodiment of a fastener with some of the parts of a re-usable banding system.

In the stowed position of FIG. 1, the cables such as 10 attach to the stringers by an attachment shown and discussed in FIG. 4. The cables attach to the stringer via a pallet cable hook 24 and the cables have end swage balls 16 that affix the cables to the pallet cables hooks in both the stowed position shows in FIG. 1 and the deployed arrangement shown in FIG. 2. Edge protectors such as 18 that deploy during use on the cargo slide along the cables, so stow on the cable out of the way when on an empty pallet.

Once the cables are attached to the pallet, the tightening drive allows the user to tighten the cables to secure the system in the cavities. In one embodiment, the tightening drive is reversible and in one embodiment is a 40:1 ratio and self-locking.

Figure 2:
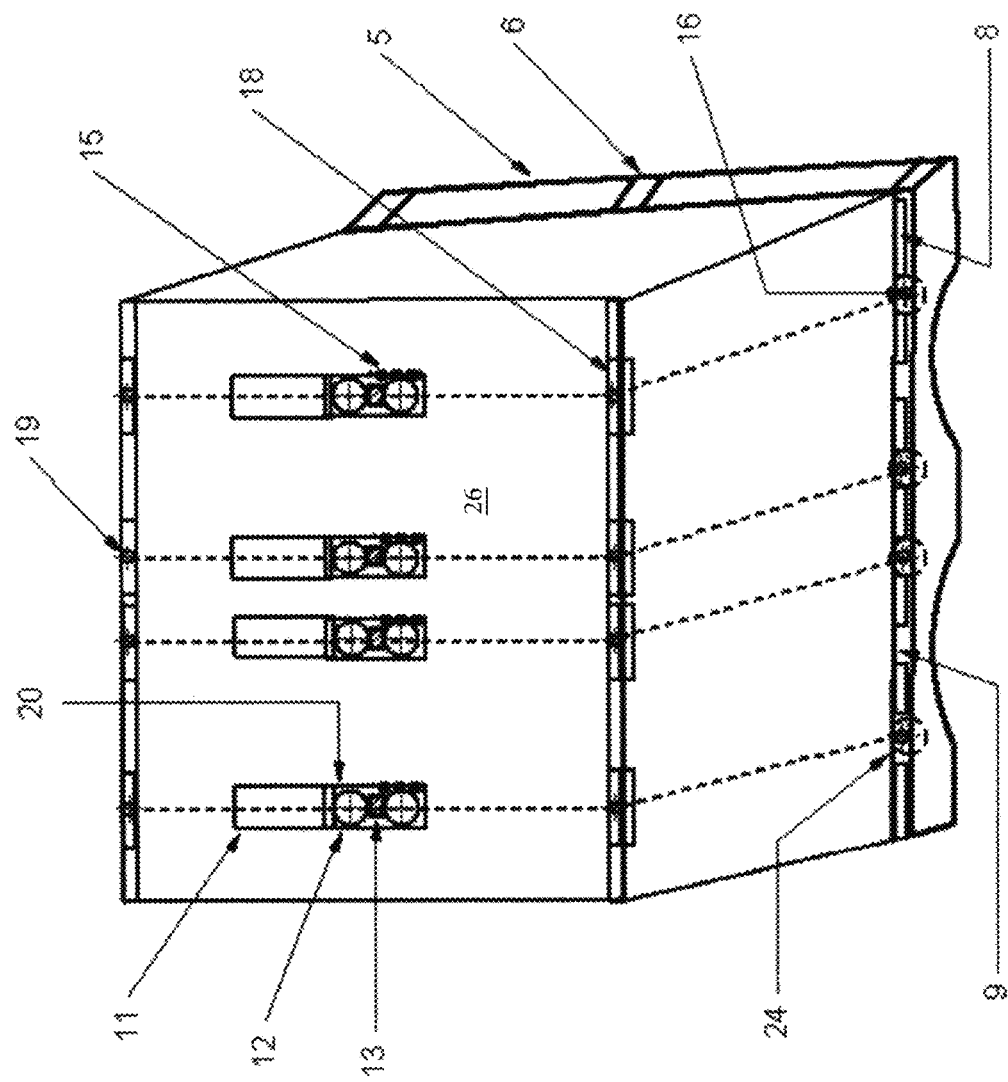
FIG. 2 shows a top/side view of a loaded pallet employing an embodiment of a re-usable banding system.

FIG. 2 shows an embodiment of the re-usable cable system when deployed. In use, the user removes the stowed block assemblies from the empty pallet, disconnecting the cable hooks from the cables. Once the pallet receives the load of cargo 26, the user sets the tightening drive body 20 on top of cargo. The user would then extend the two cables on either side of the tightening drive body 20 to connect the end swage balls 16 on the cables with the pallet cable hooks 24 on the two outside stringers 6. Using the tightening drive, the user ratchets the cables to the desired tension. The tightening drive has a recessed handle 15 that allows tightening that may have a protective sliding lid 11.

The edge protectors 18 slide along the cable through eyelets such as 19 and are placed on the sides to prevent damage to the cargo and holds the cables in place. When unloading occurs, the operator pulls the retractable handle from the recessed pocket on top of the block and reverses the direction of operation thus releasing the cable tension. They then place the end swage balls 16 back into the cable pallet hooks 24 and tightens the cable to a flush arrangement within the pallet cavities 9.

Figure 3:
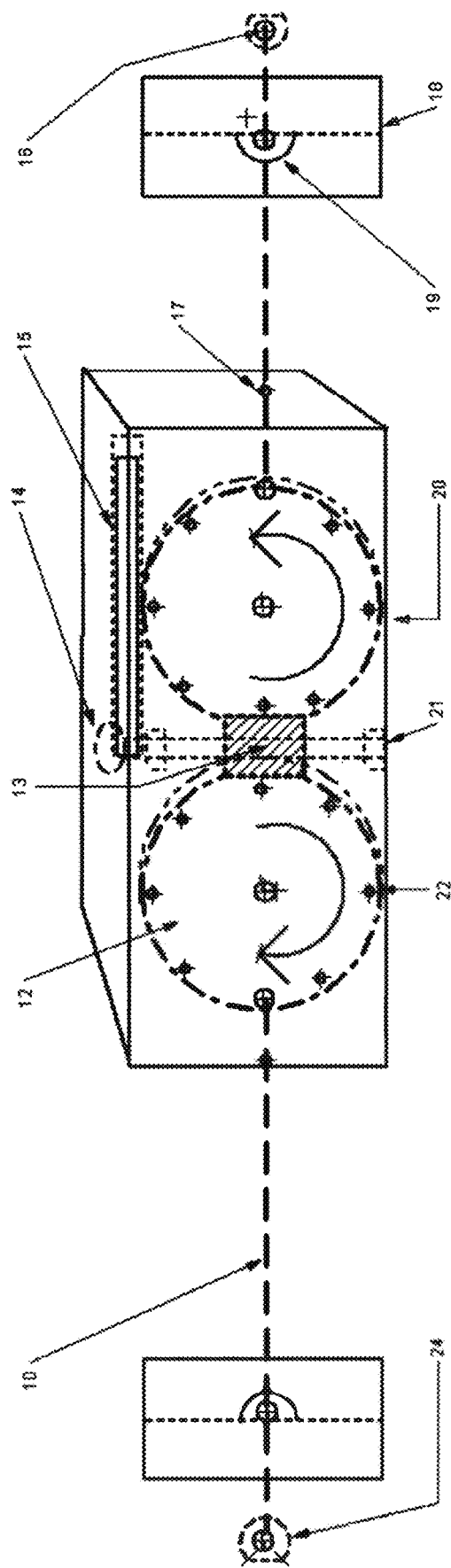
FIG. 3 shows an embodiment of a re-usable banding system tightening mechanism.

FIG. 3 shows an embodiment of the tightening drive body 20 holding the tightening drive 13. In this embodiment, the tightening drive comprises a worm drive with a worm screw or gear accessed by hole 14 and using two pulley/gears 12, with a recessed ratchet handle 15. The worm drive has a worm drive shaft bearing 21 and the cables have cable retainer pins 22. The sides of the tightening drive body 20 have holes such as 17 to allow the cables 10 to exit the tightening drive body. Similarly, the edge protectors such as 18 have cable retainer eyelets 19 through which the cables pass to reach the pallet cable hooks 24.

FIG. 4 shows the attachment of the pallet cables hooks 24 to the stringers in the stowed position where the block assemblies reside in the empty cavities of a pallet. The edge protectors 18 slide along the cables and are held in place on the edge of the pallet by the pallet cable hook 24 that protrudes through the access hole 30 on the side of the edge protector. In the stowed position, as shown in the drawing, the edge protector covers the pallet cable hook L-bracket 32 and the edge protector 18 is held in place by the cable 10 and the swage ball 16 connection. In the cargo position, shown in FIG. 2, the edge protector slides up the cable to the top of the cargo and the cable is reconnected to the pallet cable hook that is permanently attached to the pallet stringer.

In an alternative embodiment, one can have the cables and their reel stowed in a foot of the pallet. This embodiment will more than likely be used in higher-end pallets. A typical wooden pallet, either stringer or block, only lasts about a year. In addition, both wooden pallets and plastic pallets present a fire risk if stacked near a structure. Higher-end pallets may consist of aluminum, which makes it easier to attach a foot that contains at least one compartment. One possible example is what is referred to as a stillage pallet.

Some embodiments may have four compartments, each having at least one cable to reach across the load and connect with a cable from its opposing compartment. Others may have one cable in each of two compartments that reside 90-degrees from each other, and reach all the way across the load and fasten to the pallet on the far side of the load. However, depending upon the load having only lines of restraint, of either one or two cables, crossing along opposite axis on the load may not provide a secure enough mounting.

The embodiment discussed here involves two compartments, each with two cables, used to secure either side of a cargo net that covers the load. While the discussion below addresses this embodiment for ease of understand, the discussion does not intend to limit the scope of the invention to this particular embodiment. The scope of the claims cover any pallet of any type that has a compartment to store at least one cable, used with a cargo net or not.

Figure 5:
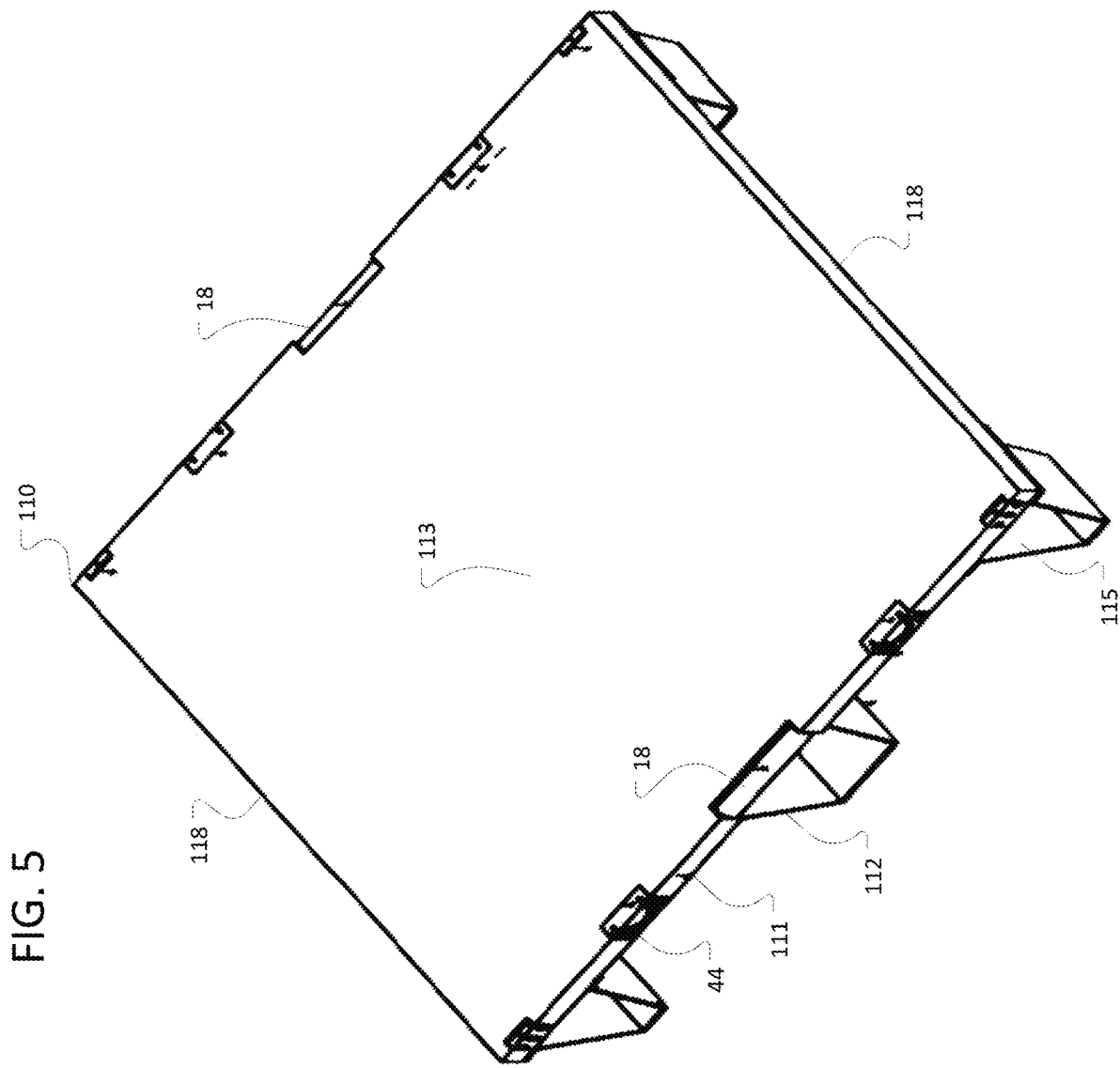
FIG. 5 shows a perspective view of an embodiment of a re-usable pallet having at least one pallet compartment.

FIG. 5 shows an embodiment of a pallet 110 that contains a compartment 112. The pallet has two end 118, two sides 111, and contains at least one compartment such as 112. The compartment 112 contains at least one cable used to secure a load, either in conjunction with at least one cable from an opposing compartment, not visible in this view, a cargo net, or both a cargo net and at least one cable from each of the compartments 112 and its opposing compartment. The cargo net may attach to the pallet using the cables that connect to the pallet at connector 44, shown in more detail in FIG. 8.

The pallet has a center portion 113 in FIG. 5 that comprises a load area where the load will be loaded. In the below discussion, there compartment 112 and its opposing compartment and they are located adjacent a center of the sides 111, each adjacent a center of opposite sides. These compartments could also be located adjacent an end of each of the opposite sides at opposite ends from each other, as well as other positions. The pallet will also contain at least one roller 118, shown for adjacent the foot of the pallet that contains the compartment 112, and its opposite position.

Figure 6:
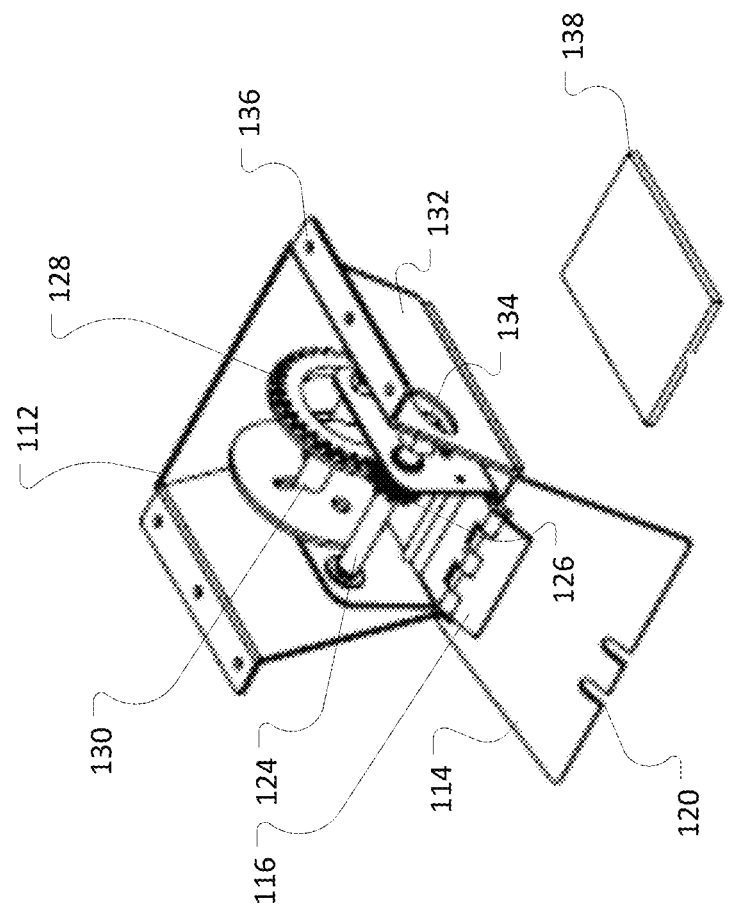
FIG. 6 shows an embodiment of a pallet compartment.

FIG. 6 shows a closer view of the pallet compartment 112. The compartment 112 has a cover panel 114, a hinge 116, and notches such as 120. The notches allow the cables to exit the compartment so it does not have to open to let the cables exit. The cover panel 114 rotates around the hinge 116 to close the compartment during travel. One should note that this embodiment shows two notches, but the cover may only have one depending upon how many cables the compartment contains.

The compartment in the embodiment has 2 rods, each having a gear on one end. The gear rod 124 has a gear 126 that meshes with the gear 128 on the reel rod 130. The cables wrap around the reel rod 130 when stored. The user can pull the cable or cables out of the compartment and the reel rod 130 will spin and cause the reel rod 130 to spin as well. To retract the cables, the user can insert a wrench or other tool into the hole 134 in the side panel 132 and can spin the gear rod 124 to pull the cable or cables back into the compartment. The compartment attaches to the underside of the pallet using flanges 136.

The compartment may replace other feet on the pallet or may be part of a custom pallet that has places for the compartments to mount. Aluminum or other metal pallets, having metal feet may score or otherwise damage concrete or other floors, especially when loaded, as they move across the surface. The pallet may also include pads such as 138 that attach to the underside of the feet, including the compartment, to avoid the damage.

Figure 7:
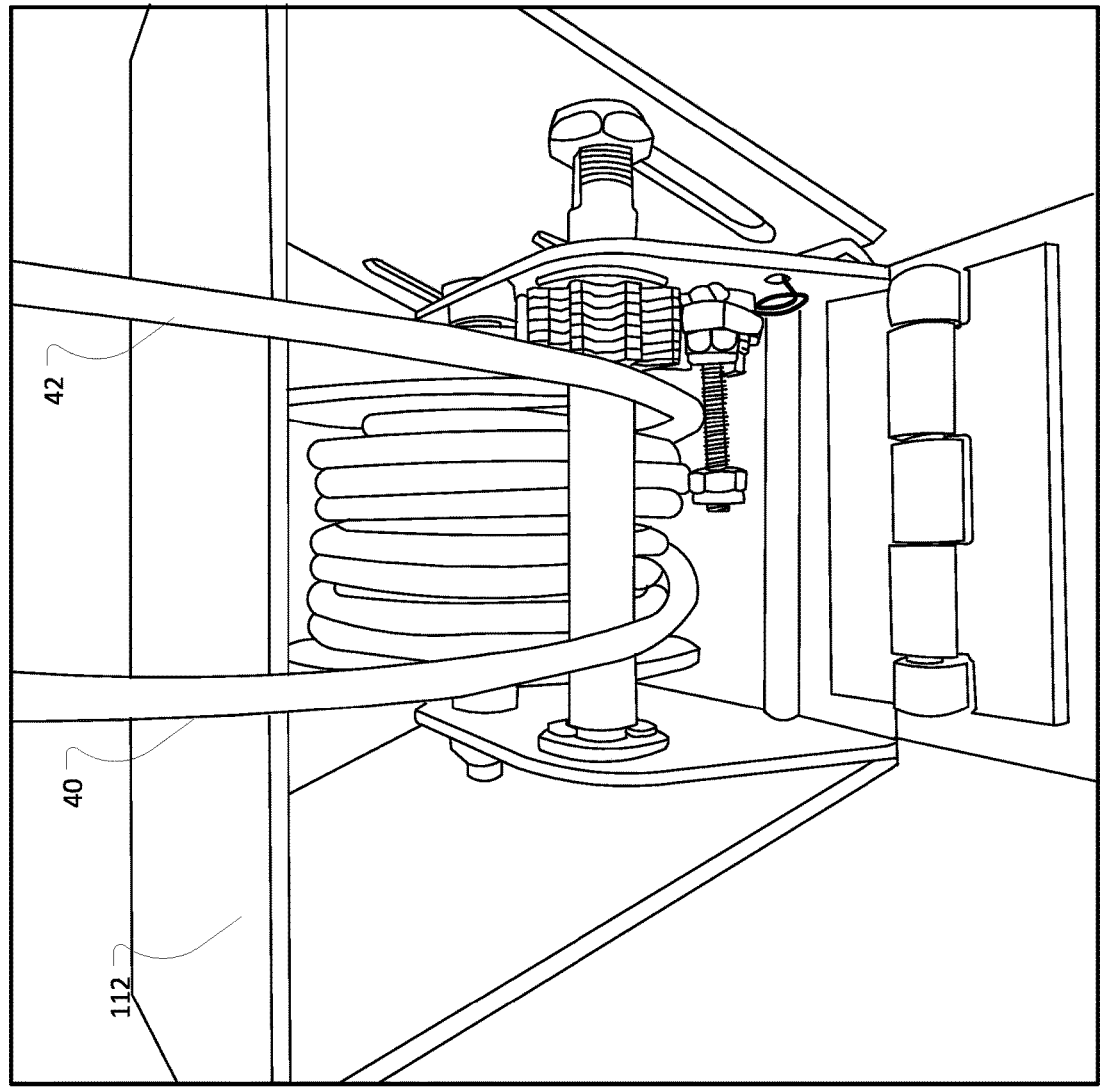
FIG. 7 shows an embodiment of a pallet compartment with cables.

FIG. 7 shows an example of a compartment 112 having cables 40 and 42. This particular embodiment has two cables situated to be pulled out in opposite directions to anchor a cargo net on either side of the compartment. As mentioned above, the compartment will typically reside in the center of the pallet, but one could have the compartment on one end of the pallet, with one cable designed to anchor a cargo net the length of the pallet.

Figure 8:
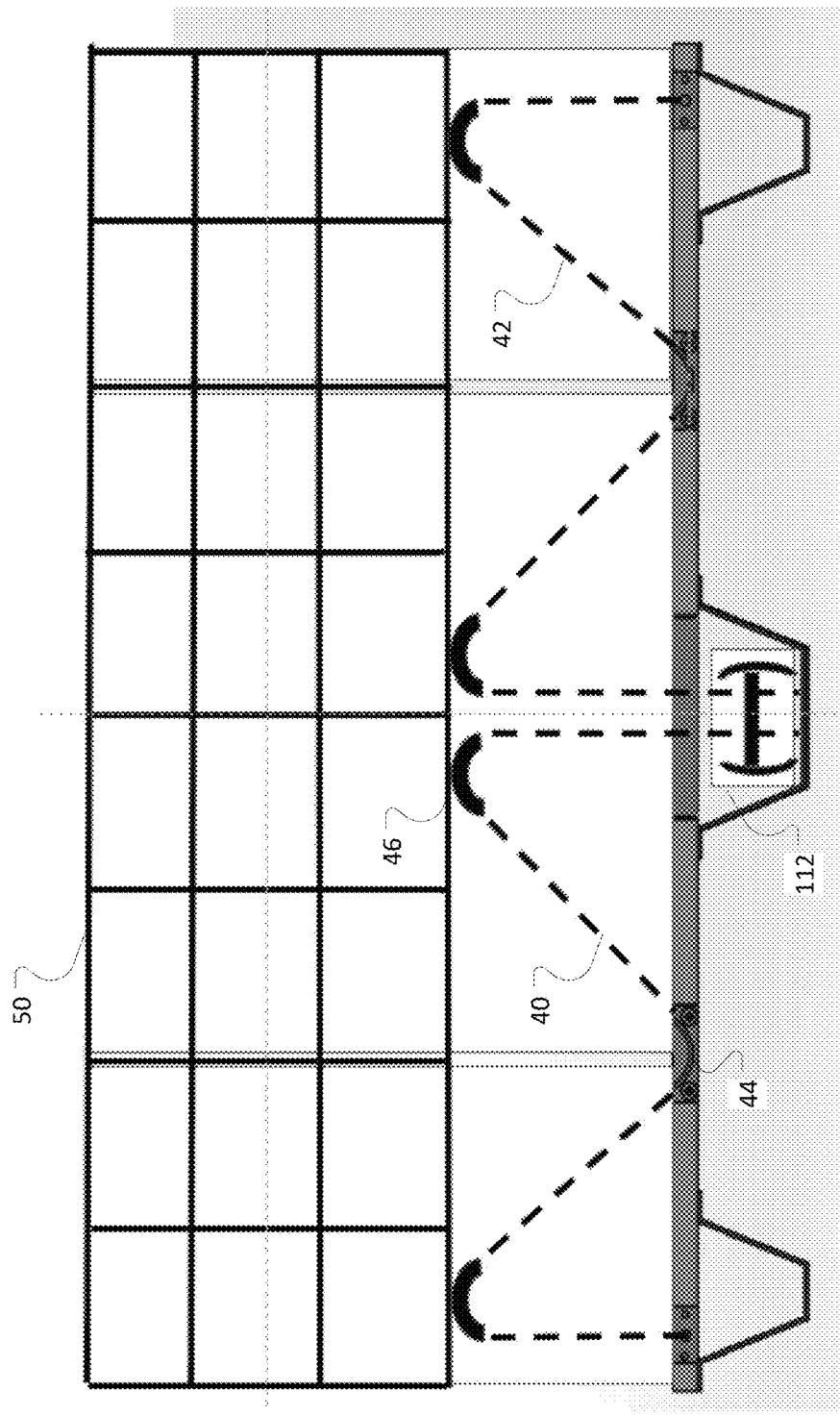
FIG. 8 shows an embodiment of a pallet pockets with deployed cables and a cargo net.

FIG. 8 shows an embodiment of a compartment having deployed cables 40 and 42. The cables attached to a cargo net 50. The cables connect to the cargo net through net connectors 46, and also connect to the pallet at cargo connectors 44. This anchors this side of the cargo net, with a second set of cables on the opposite sides of the net. This provides a secure means to keep the load attached to the pallet. In this manner, a re-usable system including a pallet and a compartment to contain cables used to secure loads.

Although specific embodiments have been illustrated and described for purposes of illustration, it will be understood that various modifications may be made without departing from the spirit and scope of the disclosure.

What is claimed is:

1. A pallet system, comprising:
    a pallet having two sides, two ends, a load area, and at least two feet; and
    at least one compartment inside at least one of the feet, the compartment comprising:
        a reel rod holding a first gear;
        a front compartment cover;
        a hinge to allow the front compartment cover to open; and
        at least one cable on the reel rod.

2. The pallet system claimed in claim 1, further comprising a gear rod having a second gear mated with the first gear.

3. The pallet system claimed in claim 2, the compartment having at least one side panel, the side panel having a hole positioned to allow access to an end of the gear rod.

4. The pallet system claimed in claim 1, further comprising a roller attached to the pallet adjacent the compartment.

5. The pallet system claimed in claim 1, the compartment further comprising a flange on either side of the compartment positioned to allow the compartment to attach to the pallet.

6. The pallet system claimed in claim 1, wherein the front compartment cover further comprises at least one notch through which the at least one cable can exit the compartment.

7. The pallet system claimed in claim 1, wherein the at least one notch comprises two notches.

8. The pallet system claimed in claim 1, wherein the at least one cable comprises two cables on the reel rod.

9. The pallet system claimed in claim 1, wherein the at least one compartment comprises two compartments on opposite sides of the load area on the pallet.

10. The pallet system claimed in claim 9, wherein the two compartments are located adjacent a center of each of the sides.

11. The pallet system claimed in claim 9, wherein the two compartments are located adjacent opposite ends of each side.

12. The pallet system claimed in claim 1, further comprising a cargo net.

13. The pallet system claimed in claim 1, further comprising at least two connectors attached to each side of the pallet, the connectors configured to attach to the at least one cable.

14. The pallet system claimed in claim 1, further comprising a pad on an underside of the at least two feet.

\* \* \* \* \*